United States Patent

Bonzini

(10) Patent No.: US 9,594,583 B2
(45) Date of Patent: Mar. 14, 2017

(54) LIGHTWEIGHT SNAPSHOTS FOR VIRTUAL DISKS

(71) Applicant: Red Hat, Inc., Raleigh, NC (US)

(72) Inventor: Paolo Bonzini, Turate (IT)

(73) Assignee: Red Hat, Inc., Raleigh, NC (US)

( * ) Notice: Subject to any disclaimer, the term of this patent is extended or adjusted under 35 U.S.C. 154(b) by 425 days.

(21) Appl. No.: 14/078,363

(22) Filed: Nov. 12, 2013

(65) Prior Publication Data

US 2015/0135174 A1 May 14, 2015

(51) Int. Cl.
*G06F 9/455* (2006.01)

(52) U.S. Cl.
CPC ............... *G06F 9/45558* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 5,475,820 A * | 12/1995 | Natrasevschi | ........ | G06F 3/0601 711/100 |
| 5,717,893 A * | 2/1998 | Mattson | ................ | G06F 12/084 711/129 |
| 5,870,551 A * | 2/1999 | Ozden | ................... | G06F 12/121 709/231 |
| 5,933,853 A * | 8/1999 | Takagi | .................... | G06F 12/08 711/113 |
| 6,266,712 B1 * | 7/2001 | Henrichs | ............... | G06F 3/0608 710/8 |
| 7,529,897 B1 * | 5/2009 | Waldspurger | ....... | G06F 11/1438 711/161 |
| 7,653,794 B2 | 1/2010 | Michael et al. | | |
| 7,802,302 B1 | 9/2010 | Nagarkar et al. | | |
| 7,979,651 B1 * | 7/2011 | Ramanathan | ....... | G06F 11/2058 711/112 |
| 8,046,550 B2 | 10/2011 | Feathergill | | |
| 8,117,168 B1 | 2/2012 | Stringham | | |
| 8,234,469 B2 | 7/2012 | Ranade | | |
| 8,301,602 B1 * | 10/2012 | Jiang | ................. | G06F 17/30129 707/649 |
| 8,364,639 B1 | 1/2013 | Koryakina et al. | | |

(Continued)

OTHER PUBLICATIONS

Neeta Garimella; "Understanding and exploiting snapshot technology for data protection, Part 1: Snapshot technology overview" IBM, Apr. 26, 2006; (Garimella_2006.pdf; pp. 1-8).*

(Continued)

*Primary Examiner* — Hiren Patel
(74) *Attorney, Agent, or Firm* — Lowenstein Sandler LLP

(57) ABSTRACT

A snapshot manager in a virtual machine monitor receives a write request comprising data from a guest operating system of a virtual machine, wherein the write request is directed to a sector of a virtual disk associated with the virtual machine. The snapshot manager writes the data from the guest operating system of the virtual machine to the sector in a base image of the virtual disk, the base image comprising a current version of the virtual disk, wherein the virtual disk comprises the base image and a overlay image, the overlay image comprising a snapshot of the base image at a previous point in time.

17 Claims, 5 Drawing Sheets

(56) References Cited

U.S. PATENT DOCUMENTS

| | | | | |
|---|---|---|---|---|
| 8,495,316 B2* | 7/2013 | Nagarkar | G06F 9/45533 | 711/162 |
| 8,656,123 B2* | 2/2014 | Lee | G06F 3/0605 | 711/162 |
| 8,769,222 B2* | 7/2014 | Liu | G06F 11/1451 | 711/161 |
| 8,782,365 B1* | 7/2014 | Mooring | G06F 8/53 | 711/162 |
| 8,881,144 B1* | 11/2014 | Banerjee | G06F 9/461 | 707/813 |
| 9,135,049 B2* | 9/2015 | Mizrahi | G06F 9/45558 | |
| 9,442,753 B2* | 9/2016 | Zheng | G06F 9/445 | |
| 2001/0013102 A1* | 8/2001 | Tsuchiya | G06F 11/1464 | 714/4.5 |
| 2002/0064281 A1* | 5/2002 | Ishizaka | G06F 21/6209 | 380/201 |
| 2002/0112022 A1* | 8/2002 | Kazar | G06F 17/30106 | 709/217 |
| 2004/0093474 A1* | 5/2004 | Lin | G06F 17/30138 | 711/162 |
| 2004/0133602 A1* | 7/2004 | Kusters | G06F 3/061 | |
| 2006/0143407 A1* | 6/2006 | Humlicek | G06F 12/0804 | 711/143 |
| 2007/0156985 A1* | 7/2007 | Tsai | G06F 11/1435 | 711/162 |
| 2007/0174569 A1* | 7/2007 | Schnapp | G06F 3/0604 | 711/162 |
| 2008/0126699 A1* | 5/2008 | Sangapu | G06F 11/1435 | 711/114 |
| 2008/0140963 A1* | 6/2008 | Thomason | G06F 11/1435 | 711/162 |
| 2008/0244028 A1* | 10/2008 | Le | G06F 3/0607 | 709/208 |
| 2008/0320316 A1* | 12/2008 | Waldspurger | H04L 63/083 | 713/189 |
| 2009/0006794 A1* | 1/2009 | Mizuta | G06F 11/2082 | 711/162 |
| 2009/0113109 A1* | 4/2009 | Nelson | G06F 11/203 | 711/6 |
| 2010/0049918 A1* | 2/2010 | Noguchi | G06F 3/0613 | 711/114 |
| 2010/0070978 A1* | 3/2010 | Chawla | G06F 9/5077 | 718/105 |
| 2010/0235831 A1* | 9/2010 | Dittmer | G06F 9/45558 | 718/1 |
| 2010/0299667 A1* | 11/2010 | Ahmad | G06F 12/1018 | 718/1 |
| 2011/0191555 A1* | 8/2011 | Narayanan | G06F 12/00 | 711/162 |
| 2011/0191834 A1* | 8/2011 | Singh | G06F 17/00 | 726/6 |
| 2011/0246985 A1* | 10/2011 | Zhou | G06F 9/445 | 718/1 |
| 2013/0036091 A1 | 2/2013 | Provenzano et al. | | |
| 2013/0219135 A1* | 8/2013 | Knowles | G06F 9/45558 | 711/159 |
| 2014/0095823 A1* | 4/2014 | Shaikh | G06F 12/02 | 711/165 |
| 2014/0181015 A1* | 6/2014 | Bonzini | G06F 17/30578 | 707/613 |
| 2014/0195753 A1* | 7/2014 | Khatri | G06F 9/45533 | 711/162 |
| 2015/0067390 A1* | 3/2015 | Blake | G06F 11/1469 | 714/15 |
| 2015/0081994 A1* | 3/2015 | Christopher | G06F 11/1458 | 711/162 |

OTHER PUBLICATIONS

Wang et al.; "Checkpointing Virtual Machines Against Transient Errors" IEEE 2010; (Wang_2010.pdf; pp. 1-6).*

Ong et al.; "VCCP: A Transparent, Coordinated Checkpointing System for Virtualization-based Cluster Computing", IEEE 2009; (Ong_2009.pdf; pp. 1-10).*

Chen et al.; "Fast, On-demand Software Deployment with Lightweight, Independent Virtual Disk Images", IEEE 2009; (Chen_2009.pdf; pp. 1-8).*

Paolo Bonzini; "Live block device operations in QEMU", Red Hat, Jun. 2012; (2012_bonzini.pdf; pp. 1-24).*

Colp, et al.; "Breaking Up is Hard to Do: Security and Functionality in a Commodity Hypervisor", Oct. 23-26, 2011.

Moreton, Tim, "A Wide-Area file System for Migrating Virtual Machines", Mar. 2008.

* cited by examiner

LIGHTWEIGHT SNAPSHOTS FOR VIRTUAL DISKS

TECHNICAL FIELD

This disclosure relates to the field of virtual machine systems and, in particular, to lightweight snapshots for virtual disks.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the virtual machine.

BRIEF DESCRIPTION OF THE DRAWINGS

The present disclosure is illustrated by way of example, and not by way of limitation, in the figures of the accompanying drawings.

DETAILED DESCRIPTION

Figure 1:
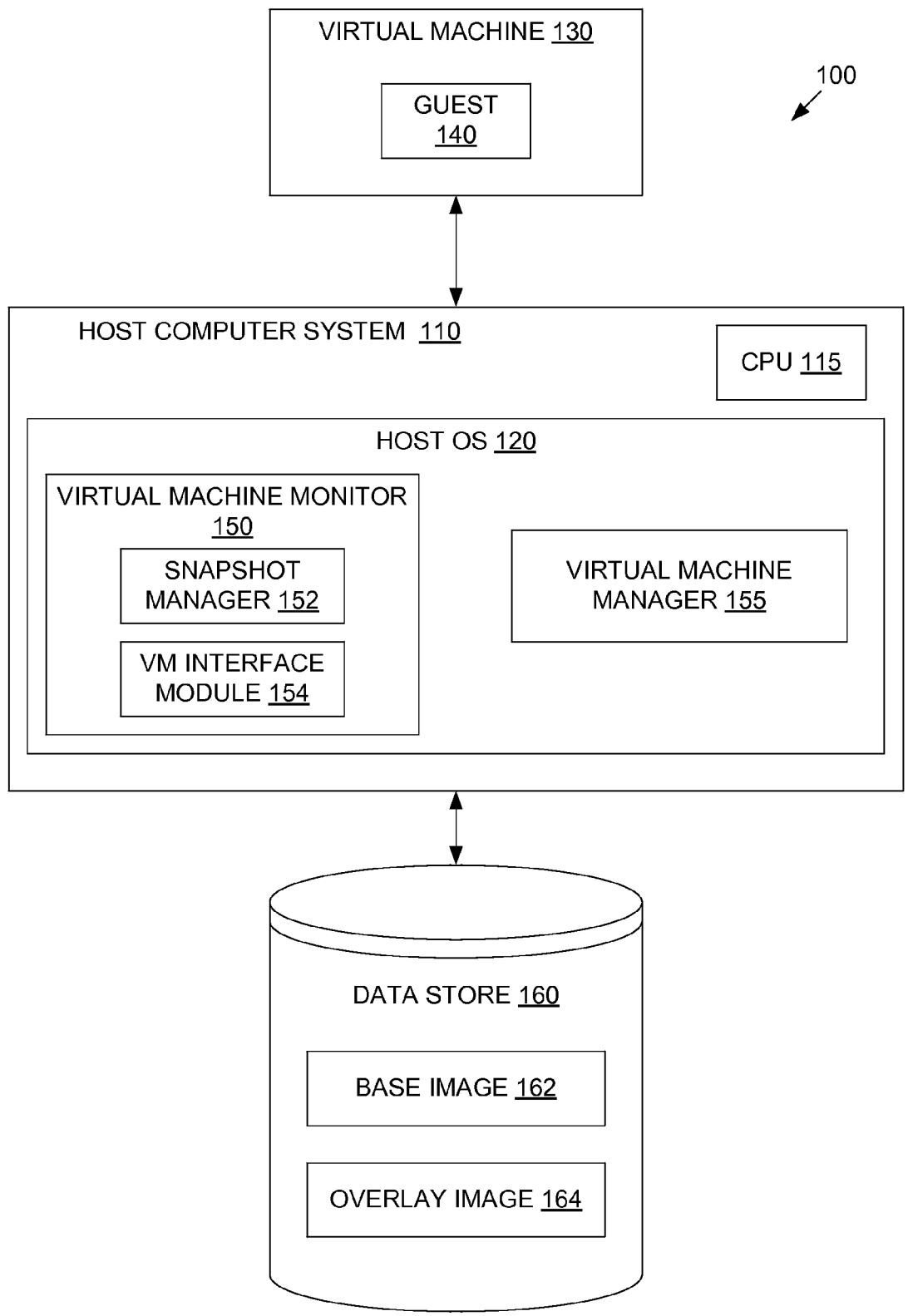
FIG. 1 is a block diagram illustrating an example network architecture in which embodiments of the present disclosure may operate.

The following description sets forth numerous specific details such as examples of specific systems, components, methods, and so forth, in order to provide an understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for lightweight snapshots for virtual disks. Periodically, a virtual machine monitor may perform management operations that are not directly related to operation of the virtual machines. The management operations, however, make use of the underlying hardware resources that support the virtual machines. Certain management operations typically require that the operations of the virtual machines be temporarily halted or suspended until the management operations are complete. It would be beneficial, however, to perform "live" management operations that occur without causing any downtime of the virtual machines. The "live" management operations should not interfere or conflict with the data access operations of the virtual machines supported by the virtual machine monitor. In one example, the storage subsystem in a virtual machine monitor supports several kinds of live operations on virtual disks. This enables maintenance operations to run without causing downtime of the virtual machines.

One feature that helps in implementing live operations is splitting disk images between a "base" image and an "overlay" image. In one example, the overlay image starts with all sectors marked as "absent." Disk writes may be sent to the overlay image, and the corresponding sectors of the overlay image are marked as present. Reads may also be sent to the overlay image, whereby sectors that are absent in the overlay image are automatically fetched by the virtual machine monitor from the base image.

One example of a maintenance operation is creating a snapshot of the disk, whereby the current contents of the disk become the base of a new overlay image. Snapshots are useful because they provide a static, consistent view of the virtual machine's storage. A different use of snapshots is to analyze a disk's filesystems (e.g., gathering usage information, capturing logs, etc.). This is useful in order to present relevant data in a management dashboard, or to check for alarm situations without needing any collaboration from the virtual machine itself. In this scenario, snapshots need to survive until the scan is complete, a time on the order of seconds or minutes. The cost of merging the overlay image back to its base image is then important. Live operations have a performance cost and it is important that this cost does not exist at the end of the scan.

To perform live maintenance operations with a low performance cost, in one embodiment, a snapshot manager in the virtual machine monitor uses a copy-on-write algorithm whose purpose is to create backups outside the base-overlay chain. Such a backup process streams data from the disk to a new storage backend (e.g., a file, a partition, a logical volume, or a network server that accepts I/O operations using well-known network protocol). Whenever a write happens on the source disk, and the sector has not been copied yet to the backup disk, the current contents of the disk are read and written to the backup disk before the source is modified.

In one example, when a snapshot is created, the newly-created image is an overlay of the disk that is seen by the virtual machine. The virtual machine still has the same "topmost" overlay, which is the base of the newly-created image, and hence directs reads or writes to the same image as before. The newly-created image is not visible to the virtual machine, but rather only to the management interface that wants to scan the virtual machine's disk. In one example, the copy-on-write technique is used to ensure that the new overlay image presents a static and consistent view of the disks (i.e., the overlay image) to the management interface. Sectors that have not been written after the creation of the snapshot are marked as absent, and are fetched from the snapshot's base image. In conventional systems, virtual machine data access operations are typically directed to the overlay. This requires the virtual machine monitor to copy the entire contents of the base image to the overlay at the start of the management operation, using up potentially unnecessary storage space and resources. By instead writing data from the guest operating system of the virtual machine to the base image, and populating the overlay using copy-on-write operations, significant storage resources can be saved. Whenever the virtual machine writes to the disk, and the corresponding sector is absent in the snapshot overlay, the current contents of the disk are read from the snapshot base and written to the snapshot overlay. This write "masks" the contents of the sector in the snapshot's base image, allowing the write to be performed on the snapshot's base image.

FIG. 1 illustrates an example network architecture 100 in which embodiments of the present disclosure may operate. The network architecture 100 includes one or more host computer systems 110 configured to host multiple virtual machines 130. In one embodiment, each host computer system 110 runs a virtual machine manager 155 to manage its resources and to dispatch requests for the virtual machine 130 (e.g., start, stop, migrate storage, etc.). Each virtual machine 130 may run a guest operating system (e.g., guest 140). Each virtual machine 130 may run within a virtual machine monitor 150 that manages the virtual machine resources and provides access to physical or virtual hardware. The virtual machines 130 may run the same or different guest operating systems, such as Microsoft Windows®, Linux®, Solaris®, Mac® OS, etc. In one example, the host computer system 100 is accessible by multiple client devices via a network, which may be a private network (e.g., a local area network (LAN), a wide area network (WAN), intranet, etc.) or a public network (e.g., the Internet), or combination thereof. It is noted that the client devices may be any physical or virtual device, such as, for example, a video display (e.g., a video graphics array (VGA)), a keyboard, a printer, a network component, or a peripheral component interconnect (PCI) device.

Throughout the following description, the term "guest" refers to the software that runs or can run on the virtual machine monitor 150 that is installed on a disk, loaded into memory, or currently running. A guest may include one or more of the following: a firmware copy in memory, an operating system, additional installed software, a browser, applications running on the browser, etc. The term "virtual machine" (VM) refers to part of the virtual machine monitor 150 that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) or Advanced Configuration and Power Interface (ACPI) which is provided to the guest, etc.

The host computer system 110 may be a server, a workstation, a personal computer (PC), a mobile phone, a palm-sized computing device, a personal digital assistant (PDA), etc. The host computer system 110 may also be coupled to one or more data stores 160. The data store 160 may be shared storage available to the host computer systems 110 and/or may be network data stores such as a storage area network (SAN), network attached storage (NAS) or cloud based storage (e.g., storage as a service (SaaS)).

In an example, the host computer system 110 runs a virtual machine monitor 150 and a virtual machine manager 155 to virtualize access to the resources available to the host computer system 110, making the use of the virtual machine 130 transparent to the guest 140 and the users of the host computer system 110. In one example, the virtual machine monitor 150 and the virtual machine manager 155 are components of a host operating system (OS) 120. Alternatively, the virtual machine monitor 150 and the virtual machine manager 155 may run on top of a host OS 120, or may run directly on host hardware without the use of a host OS. The virtual machine monitor 150 and the virtual machine manager 155 manage system resources, including access to memory, devices, storage devices (e.g., data store 160), and so on. The virtual machine monitor 150 and the virtual machine manager 155, though typically implemented in software, may emulate and export a bare machine interface (host hardware) to higher level software. Such higher level software may comprise a standard or real-time operating system (OS), may be a highly stripped down operating environment with limited operating system functionality, may not include traditional OS facilities, etc. The virtual machine monitor 150 and the virtual machine manager 155 present to other software (i.e., "guest" software) the abstraction of the virtual machine 130 which may provide the same or different abstractions to various guest software (e.g., guest operating system, guest applications, etc.) in a manner such that the guest is not aware that a migration process has been started, completed, aborted, etc. (e.g., the migration process and its current state is transparent to the guest). The virtual machine monitor 150 and the virtual machine manager 155 can be separate components (where one of them can also be referred to as a hypervisor) or a single component (which can also be referred to as a hypervisor).

Data store 160 may include mass storage devices which can include, for example, flash memory, magnetic or optical disks, or tape drives, read-only memory (ROM); random-access memory (RAM); erasable programmable memory (e.g., EPROM and EEPROM); or any other type of storage medium. Data store 160 may be the physical storage medium that is used by virtual machine manager 155 to provide virtual storage resources to the one or more virtual machines 130 running on host computer system 110. In one embodiment, a virtual disk provisioned from data store 160 is split or divided into a "base" image 162 and an "overlay" image 164. One or both of the base image 162 and the overlay image 164 may be snapshots of the virtual disk that provide a static consistent view of the storage for the virtual machine 130. In one embodiment, base image 162 is visible to virtual machine 130 and can receive data specified by commands (e.g., a write operation) received from virtual machine 130 or guest 140. Overlay image 164 may not be visible to virtual machine 130 and may be used by virtual machine monitor to perform maintenance operations. In one embodiment, the overlay image 164 starts with all sectors marked as "absent." When data is written to the overlay image 164 (e.g., as part of a copy-on-write operation), the corresponding sectors of the overlay image 164 are marked as "present." Reads are sent to the overlay image 164, except for sectors that are "absent" in the overlay image 164, which are fetched from the base image 162. The overlay image 164 may track the presence or absence for groups or clusters including more than one sector, rather than for each sector separately.

The virtual machine monitor 150 is configured to manage the resources when the virtual machine 130 is running. The virtual machine monitor 150 may include a snapshot manager 152 configured to manage the creation and deletion of base image 162 and overlay image 164, to perform a copy-on-write operation for the relevant sectors from base image 162 to overlay image 164, and to perform management operations using overlay image 164 without interrupting the operation of virtual machine 130. Additional details of snapshot manager 152 are provided below with regard to FIGS. 2-4. Although shown as a discrete component of the virtual machine monitor 150, it is noted that the snapshot manager 152 may be a separate component externally coupled to the virtual machine monitor 150.

In one embodiment, virtual machine monitor 150 also includes virtual machine interface module 154. Virtual machine interface module 154 may handle interactions with virtual machine 130. For example, virtual machine interface module 154 may receive a data access command (e.g., a write request for the virtual disk) from virtual machine 130. In one embodiment, virtual machine interface module 154 may identify the base image 162 in data store 160 and write the requested data to the corresponding sector in the base image 162. In one embodiment, prior to writing the data to base image 162, virtual machine interface module 154 may determine whether an overlay image 164 is currently available (e.g., one that was created as a result of a received management operation command). If an overlay image 164 is currently available, virtual machine interface module 154 may forward the write request to an overlay image interface module 204 in snapshot manager 152 (see FIG. 2 below).

Figure 2:
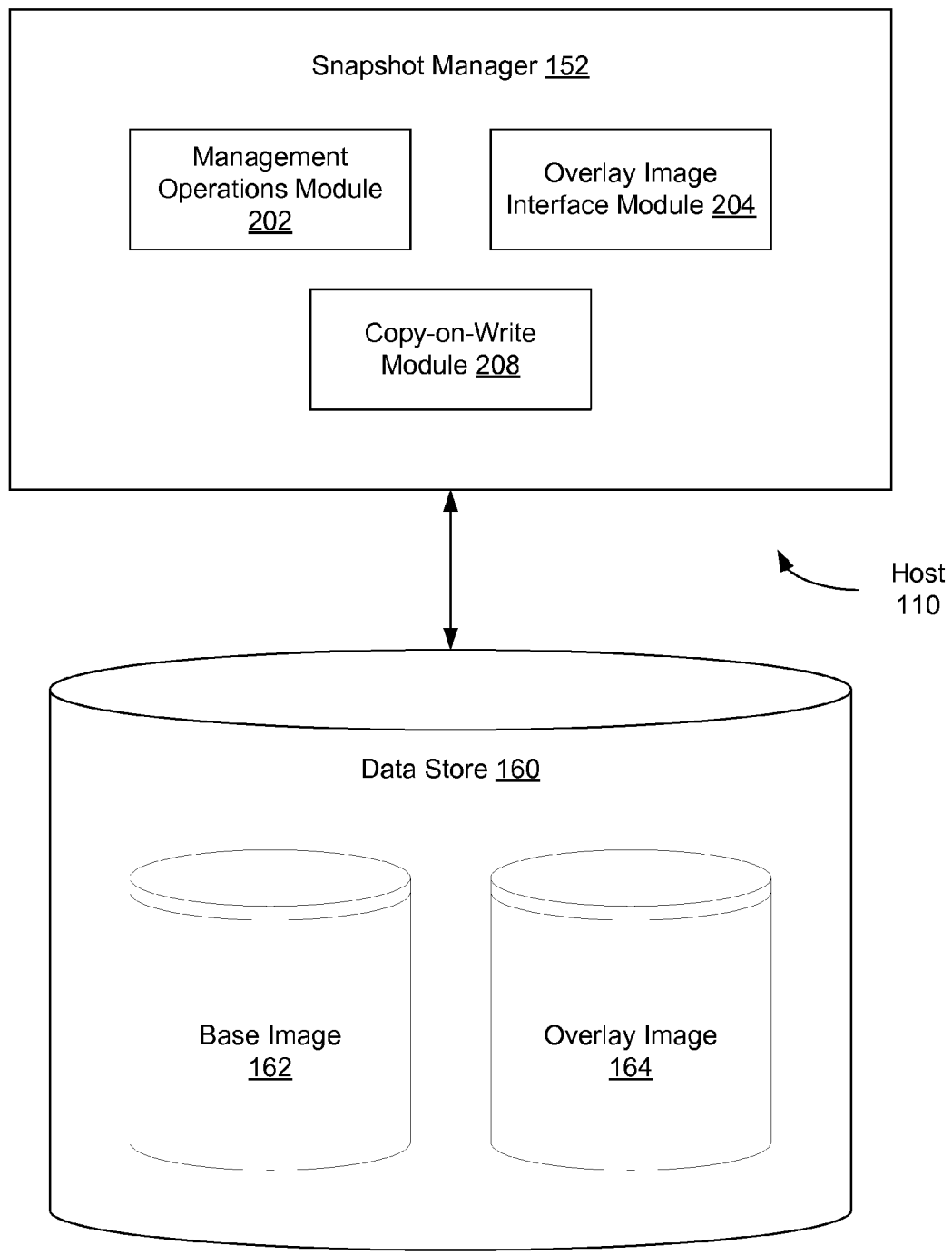
FIG. 2 is a block diagram illustrating a snapshot manager, according to an embodiment.

FIG. 2 is a block diagram illustrating a snapshot manager 152, according to an embodiment of the present invention. In one embodiment, snapshot manager 152 runs on host computer system 110, as shown in FIG. 1. In one embodiment, snapshot manager 152 includes management operations module 202, overlay image interface module 204 and copy-on-write module 208. Snapshot manager 152 may be coupled to data store 160 which includes base image 162 and overlay image 164. In one embodiment, data store 160 may be the same storage device discussed above with respect to FIG. 1.

In one embodiment, management operations module 202 performs management operations on behalf of virtual machine monitor 150. Examples of management operations can include an analysis of the virtual disk filesystems, such as gathering usage information, capturing logs, etc. In one embodiment, management operations module 202 can receive a management operation command from virtual machine manager 155. The management operation command may be issued by a user, by an administrator, or automatically by the virtual machine monitor at a periodic interval or in response to some other trigger. In one embodiment, the received management operation command includes a read request for data on the virtual disk. Management operations module 202 can forward the read request to the appropriate module in snapshot manager 152 (e.g., overlay image interface module 204) for processing of the read request. Management operations module 202 can similarly direct any additional requests associated with the management operation command until there are no requests remaining. At such point, management operations module 202 can determine that the management operation command is complete and provide an instruction for the overlay image 164 to be deleted from data store 160.

In one embodiment, overlay image interface module 204 handles interactions between snapshot manager 152 and overlay image 164 in data store 160. In one embodiment, in response to management operations module 202 receiving a management operation command, overlay image interface module 204 can determine if an overlay image 164 currently exists in data store 160. If no overlay image 164 currently exists, overlay image interface module 204 may create a new overlay image 164. In one embodiment, the new overlay image 164 may be a snapshot of the current state of the virtual disk (e.g., a snapshot of the base image 162 at a previous point in time). Upon creating the new overlay image 164, overlay image interface module 204 may initially mark all sectors in the overlay image as "absent." In one embodiment, the overlay image 164 may have a header or other metadata section that contains an indication of whether each sector (or group of sectors) is "present" or "absent."

In one embodiment, in response to management operations module 202 receiving a read request associated with the management operation command, overlay image interface module 204 can determine if the corresponding sector in the overlay image 164 is marked as "present" or "absent." If the sector in the overlay image 164 is "present," overlay image interface module 204 can read the requested data from that sector in the overlay image 164. In one embodiment, the sector in the overlay image 164 may be marked "present" if the data in the sector has previously been copied from the base image 162 to the overlay image 164 (e.g., as part of a copy-on-write operation, as described below). If the sector in the overlay image 164 is "absent," overlay image interface module 204 can read the requested data from the corresponding sector in the base image 162. Once management operations module 202 determines that the management operations command is completed, overlay image interface module 204 can delete the overlay image 164 from the data store 160.

In one embodiment, if overlay image interface module 204 determines that an overlay image 164 is available in data store 160 and that the sector (or cluster) is marked as "absent" in the overlay image 164, copy-on-write module 208 performs a copy-on-write operation. In the copy-on-write operation, copy-on-write module 208 copies data previously stored in the relevant sector from base image 162 to overlay image 164 before virtual machine interface module 154 writes new data, as part of a virtual machine write operation, to the sector in base image 162. In another embodiment, copy-on-write module 208 may copy the data from a cluster of sectors (e.g., a group of adjacent sectors), including the actual sector being written, from the base image 162 to the overlay image 164. Once copied to the overlay image 164, the copied sectors are marked as "present" in the overlay image 164. In one embodiment, this may be performed by overlay image interface module 204.

Figure 3:
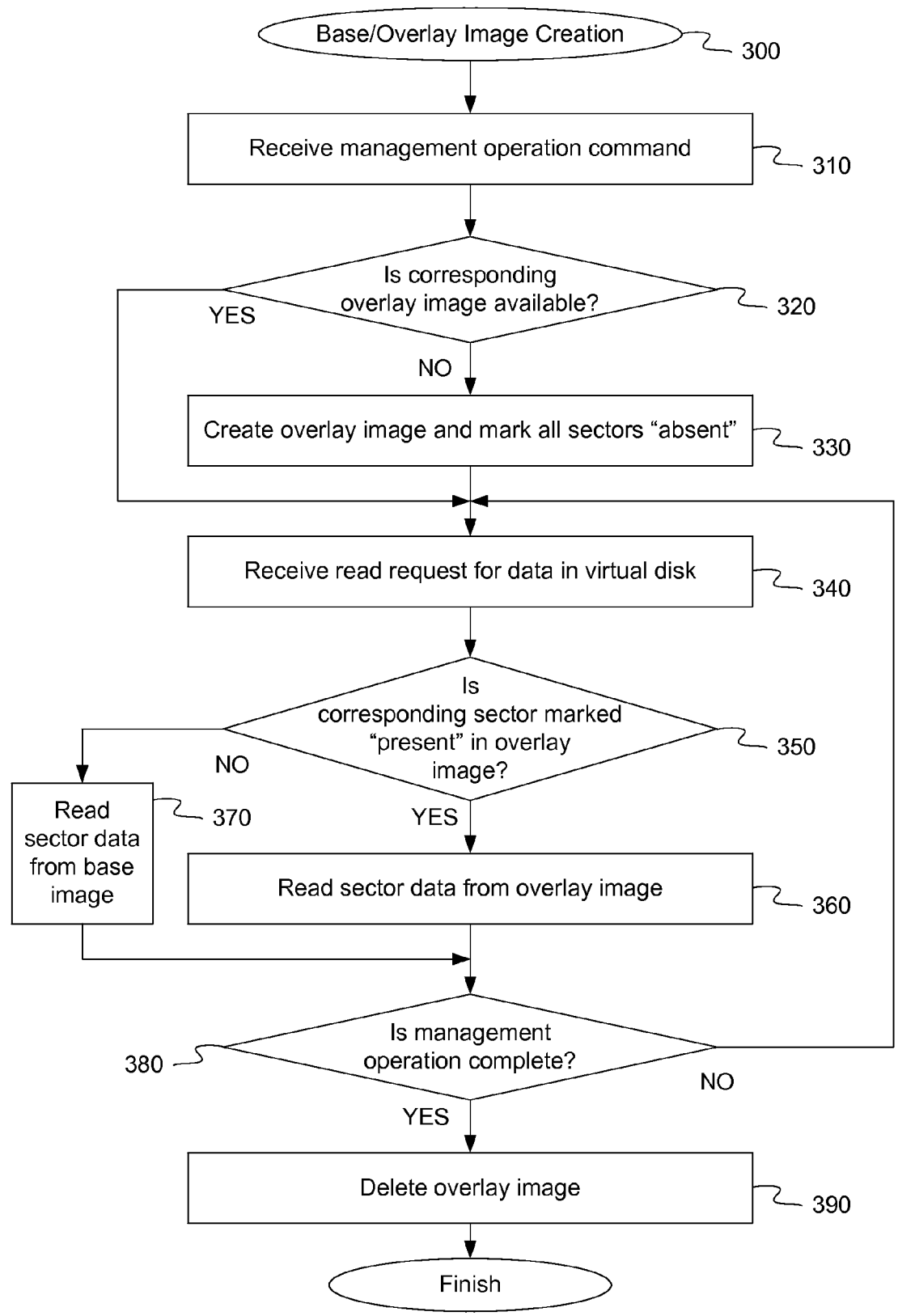
FIG. 3 is a flow diagram illustrating a method for base/overlay image creation, according to an embodiment.

FIG. 3 is a flow diagram illustrating a method for base/overlay image creation, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. The method 300 can create an overlay image from a base image of a virtual disk and use the overlay image to perform management operations without interrupting the operation of a virtual machine using the base image of the virtual disk. In one embodiment, method 300 may be performed by snapshot manager 152, as shown in FIGS. 1 and 2.

Referring to FIG. 3, at block 310 receives a management operation command. In one embodiment, management operations module 202 receives a management operation command from virtual machine manager 155. The management operation command may be issued by a user, by an administrator, or automatically by the virtual machine monitor 150 at a periodic interval or in response to some other trigger.

At block 320, method 300 determines whether a corresponding overlay image is available. In one embodiment, in response to management operations module 202 receiving a management operation command, overlay image interface module 204 can determine if an overlay image 164 currently exists in data store 160. Overlay image interface module 204 may scan data store 160 to detect the presence of an overlay image 164. Alternatively, overlay image interface module 204 may maintain a record of whether an overlay image 164 has been previously created.

If at block 320, method 300 determines that an overlay image is not available, at block 330, method 300 creates an overlay image and marks all sectors in the overlay image as "absent." In one embodiment, the new overlay image 164 may be a snapshot of the current state of the virtual disk (e.g., a snapshot of the base image 162 at a previous point in time). Upon creating the new overlay image 164, overlay image interface module 204 may initially mark all sectors in the overlay image as "absent." In one embodiment, the overlay image 164 may have a header or other metadata section that contains an indication of whether each sector (or group of sectors) is "present" or "absent." For example, overlay image interface module 204 may set the indicator for each sector to "0" or to some other value to indicate that each sector is absent.

If at block 320, method 300 determines that an overlay image is available, at block 340, method 300 receives a read request for data in the virtual disk. In one embodiment, the received management operation command includes a read request for data on the virtual disk. Management operations module 202 can forward the read request to the appropriate module in snapshot manager 152 (e.g., overlay image interface module 204) for processing of the read request.

At block 350, method 300 determines if the corresponding sector referenced in the read request is marked as "present" in the overlay image. In one embodiment, in response to management operations module 202 receiving a read request associated with the management operation command, overlay image interface module 204 can determine if the corresponding sector in the overlay image 164 is marked as "present" or "absent." For example, overlay image interface module 204 can consult the header of overlay image 164 and read the indicator associated with the sector of interest.

If at block 350, method 300 determines that the corresponding sector is "present," at block 360, method 300 reads the sector data from the overlay image. In one embodiment, the sector in the overlay image 164 may be marked "present" if the data in the sector has previously been copied from the base image 162 to the overlay image 164 (e.g., as part of a copy-on-write operation).

If at block 350, method 300 determines that the corresponding sector in the overlay image is not "present," at block 370, method 300 reads the sector data from the base image. For example, if the sector in the overlay image 164 is "absent," overlay image interface module 204 can read the requested data from the corresponding sector in the base image 162.

At block 380, method 300 determines whether the management operation is complete. Management operations module 202 can direct additional requests associated with the management operation command to the appropriate module for processing until there are no requests remaining. At such point, management operations module 202 can determine that the management operation command is complete. If at block 380, method 300 determines that the management operation is not completed, method 300 returns to block 340 and repeats the operations at blocks 340-380.

If at block 380, method 300 determines that the management operation is complete, at block 390, method 300 deletes the overlay image. Once management operations module 202 determines that the management operations command is completed, overlay image interface module 204 can delete the overlay image 164 from the data store 160.

Figure 4:
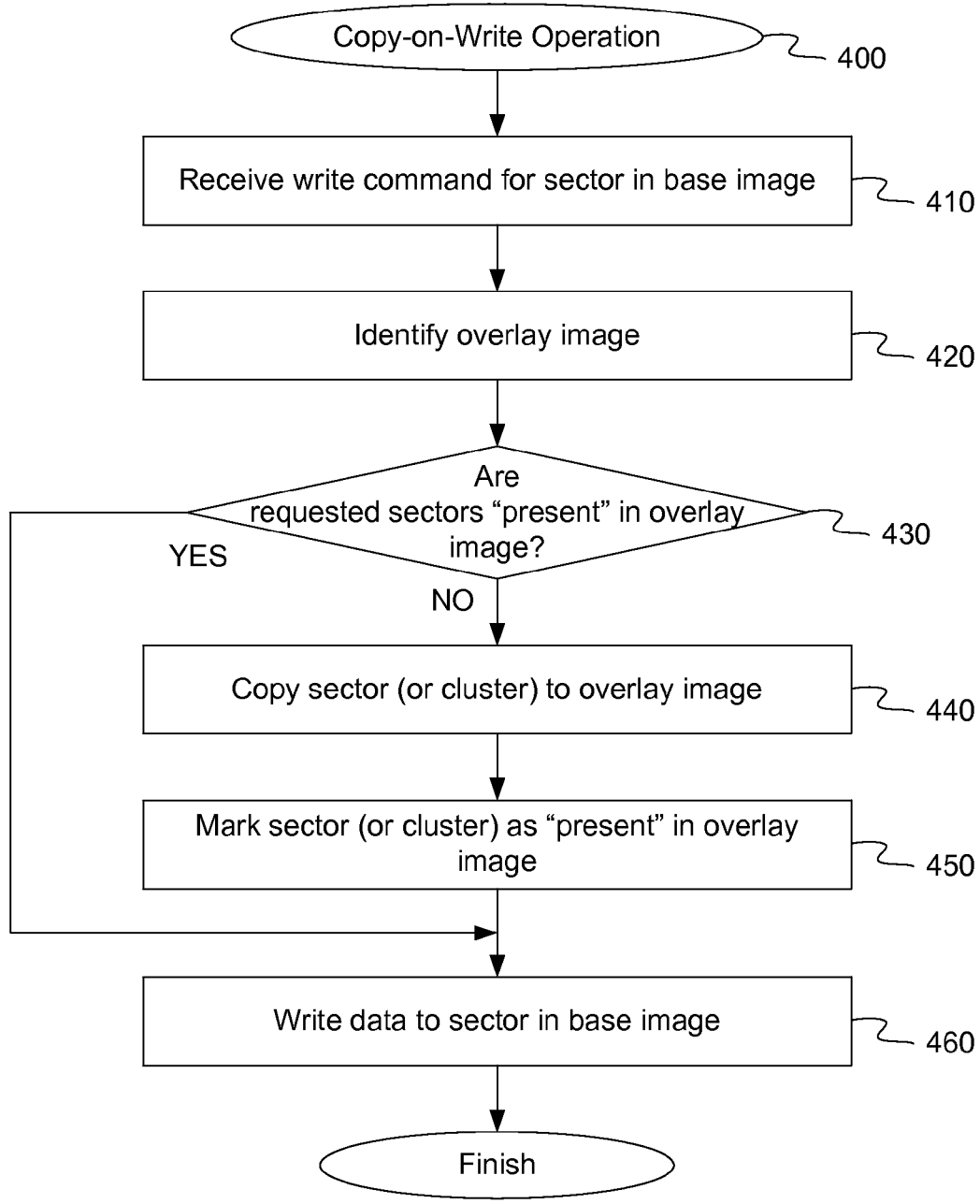
FIG. 4 is a flow diagram illustrating a method for a copy-on-write operation, according to an embodiment.

FIG. 4 is a flow diagram illustrating a method for a copy-on-write operation, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The method 400 can perform a copy-on-write operation with a virtual disk including a base image and overlay image to maintain a consistent state of the file system for performing management operations without interrupting the operation of a virtual machine. In one embodiment, method 400 may be performed by copy-on-write module 208 of snapshot manager 152, as shown in FIGS. 1 and 2.

Referring to FIG. 4, at block 410, method 400 receives a write command for a sector in the base image. In one embodiment, virtual machine interface module 154 may receive a data access command (e.g., a write request for the virtual disk) from virtual machine 130. In one embodiment, virtual machine interface module 154 may identify the base image 162 in data store 160 and notify copy-on-write module 208 before writing the requested data to the corresponding sector in the base image 162.

At block 420, method 400 identifies an overlay image corresponding to the virtual disk used by virtual machine 130. Overlay image 164 may not be visible to virtual machine 130 and may be used by virtual machine monitor 150 to perform maintenance operations. In one embodiment, the overlay image 164 starts with all sectors marked as "absent." When data is written to the overlay image 164 (e.g., as part of a copy-on-write operation), the corresponding sectors of the overlay image 164 are marked as "present." Reads are sent to the overlay image 164, except for sectors that are "absent" in the overlay image 164, which are fetched from the base image 162. The allows the overlay image 164 to function as a consistent image of the filesystem which does not change during the management operation.

At block 430, method 400 determines whether the requested sectors (or clusters) are present in the overlay image. For example, copy-on-write module 208 can consult the header of overlay image 164 and read the indicator associated with the sector of interest.

If at block 430, method 400 determines that the sectors are "absent" in the overlay image, at block 440, method 400 copies the corresponding sector for the write command to the overlay image. In one embodiment, after determining that the sectors are "absent" in the overlay image, copy-on-write module 208 performs a copy-on-write operation. In the copy-on-write operation, copy-on-write module 208 copies the relevant sector from base image 162 to overlay image 164 before virtual machine interface module 154 writes to the sector in base image 162. In another embodiment, copy-on-write module 208 may copy the data from a cluster of sectors (e.g., a group of adjacent sectors), including the actual sector being written, from the base image 162 to the overlay image 164.

At block 450, method 400 marks the copied sector in the overlay image as "present." Once copied to the overlay image 164, the copied sectors may be marked as "present" in the overlay image 164. In one embodiment, this may be performed by copy-on-write module 208. At block 460, method 400 writes data to the sector in the base image in response to the write command. In one embodiment, this may be performed by virtual machine interface module 154.

Figure 5:
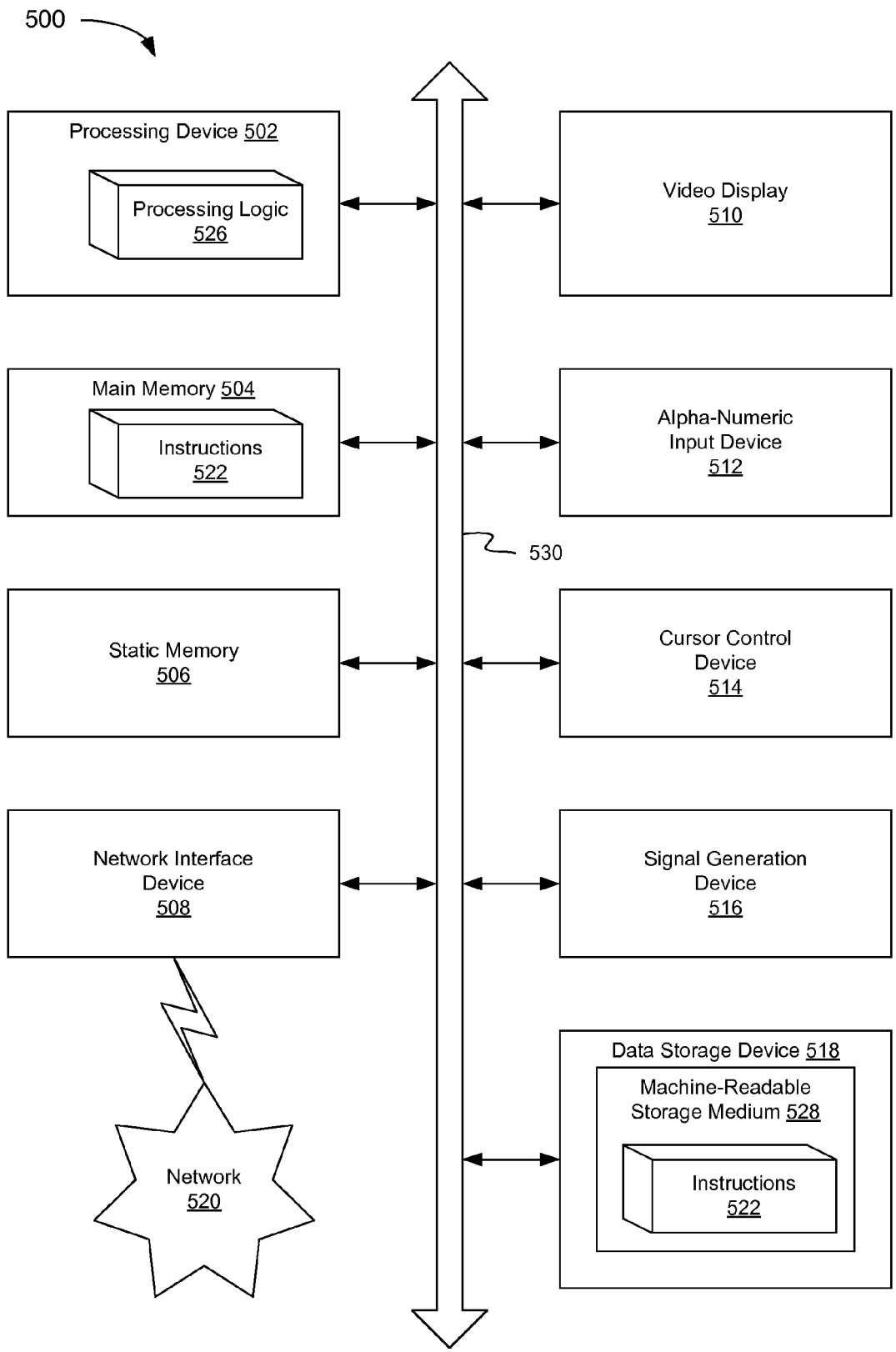
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of host computer system 110 running virtual machine monitor 150 and snapshot manager 152.

The exemplary computer system 500 includes a processing device 502, main memory 504 (e.g., read-only memory (ROM), flash memory, dynamic random access memory (DRAM) (such as synchronous DRAM (SDRAM) or Rambus DRAM (RDRAM), etc.), static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform a method for of managing virtual disks including performing copy-on-write operations in a base and overlay image context, as described herein. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that a certain operation may be performed, at least in part, concurrently with other operations. In another embodiment, instructions or sub-operations of distinct operations may be in an intermittent and/or alternating manner.

What is claimed is:

1. A method, comprising:
   receiving a write request comprising data from a guest operating system of a virtual machine, wherein the write request is directed to a sector of a virtual disk associated with the virtual machine, the virtual disk comprising a base image and an overlay image, the base image comprising a current version of the virtual disk and the overlay image comprising a snapshot of the base image prior to the current version;
   determining, by a processing device, whether a corresponding sector in the overlay image of the virtual disk is marked as present;
   responsive to the corresponding sector in the overlay image not being marked as present, copying data from the sector in the base image to the corresponding sector in the overlay image and marking the corresponding sector in the overlay image as present prior to writing the data from the guest operating system of the virtual machine to the sector in the base image of the virtual disk; and
   responsive to the corresponding sector in the overlay image being marked as present, writing, by the processing device, the data from the guest operating system of the virtual machine to the sector in the base image of the virtual disk without copying data from the sector in the base image to the corresponding sector in the overlay image.

2. The method of claim 1, further comprising:
   copying data from a plurality of sectors in a sector cluster in the base image to the overlay image, the plurality of sectors comprising the sector to which the write request is directed.

3. The method of claim 1, further comprising:
creating the overlay image of the virtual disk; and
initially marking each sector of the overlay image as absent.

4. The method of claim 1, further comprising:
receiving a management operation command comprising a read request for data in the sector on the virtual disk.

5. The method of claim 4, further comprising:
responsive to the corresponding sector in the overlay image being marked as present, reading the requested data from the corresponding sector in the overlay image; and
responsive to the corresponding sector in the overlay image not being marked as present, reading the requested data from the sector in the base image.

6. The method of claim 4, further comprising:
in response to management operation command being completed, deleting the overlay image of the virtual disk.

7. A system comprising:
a memory; and
a processing device, operatively coupled to the memory, the processing device to:
receive a write request comprising data from a guest operating system of a virtual machine, wherein the write request is directed to a sector of a virtual disk associated with the virtual machine, the virtual disk comprising a base image and an overlay image, the base image comprising a current version of the virtual disk and the overlay image comprising a snapshot of the base image prior to the current version;
determine whether a corresponding sector in the overlay image of the virtual disk is marked as present;
responsive to the corresponding sector in the overlay image not being marked as present, copy data from the sector in the base image to the corresponding sector in the overlay image and mark the corresponding sector in the overlay image as present prior to writing the data from the guest operating system of the virtual machine to the sector in the base image of the virtual disk; and
responsive to the corresponding sector in the overlay image being marked as present, write the data from the guest operating system of the virtual machine to the sector in the base image of the virtual disk without copying data from the sector in the base image to the corresponding sector in the overlay image.

8. The system of claim 7, wherein the processing device further to:
copy data from a plurality of sectors in a sector cluster in the base image to the overlay image, the plurality of sectors comprising the sector to which the write request is directed.

9. The system of claim 7, wherein the processing device further to:
create the overlay image of the virtual disk; and
initially mark each sector of the overlay image as absent.

10. The system of claim 7, wherein the processing device further to:
receive a management operation command comprising read request for data in the sector on the virtual disk.

11. The system of claim 10, wherein the processing device further to:
responsive to the corresponding sector in the overlay image being marked as present, read the requested data from the corresponding sector in the overlay image; and
responsive to the corresponding sector in the overlay image not being marked as present, read the requested data from the sector in the base image.

12. The system of claim 10, wherein the processing device further to:
in response to management operation command being completed, delete the overlay image of the virtual disk.

13. A non-transitory machine-readable storage medium storing instructions which, when executed, cause a processing device to:
receive a write request comprising data from a guest operating system of a virtual machine, wherein the write request is directed to a sector of a virtual disk associated with the virtual machine, the virtual disk comprising a base image and an overlay image, the base image comprising a current version of the virtual disk and the overlay image comprising a snapshot of the base image prior to the current version;
determine, by the processing device, whether a corresponding sector in the overlay image of the virtual disk is marked as present;
responsive to the corresponding sector in the overlay image not being marked as present, copy data from the sector in the base image to the corresponding sector in the overlay image and mark the corresponding sector in the overlay image as present prior to writing the data from the guest operating system of the virtual machine to the sector in the base image of the virtual disk; and
responsive to the corresponding sector in the overlay image being marked as present, write, by the processing device, the data from the guest operating system of the virtual machine to the sector in the base image of the virtual disk without copying data from the sector in the base image to the corresponding sector in the overlay image.

14. The non-transitory machine-readable storage medium of claim 13, wherein the instructions further cause the processing device to:
copy data from a plurality of sectors in a sector cluster in the base image to the overlay image, the plurality of sectors comprising the sector to which the write request is directed.

15. The non-transitory machine-readable storage medium of claim 13, wherein the instructions further cause the processing device to:
create the overlay image of the virtual disk; and
initially mark each sector of the overlay image as absent.

16. The non-transitory machine-readable storage medium of claim 13, wherein the instructions further cause the processing device to:
receive a management operation command comprising read request for data in the sector on the virtual disk.

17. The non-transitory machine-readable storage medium of claim 16, wherein the instructions further cause the processing device to:
responsive to the corresponding sector in the overlay image is marked as present, read the requested data from the corresponding sector in the overlay image; and
responsive to the corresponding sector in the overlay image not being marked as present, read the requested data from the sector in the base image.

* * * * *